United States Patent [19]

Petilli

[11] Patent Number: 5,249,069
[45] Date of Patent: Sep. 28, 1993

[54] METHOD AND APPARATUS FOR AUTOMATIC ALIGNMENT OF FRONT AND REAR SCANNING CAMERAS

[75] Inventor: Eugene M. Petilli, Penfield, N.Y.

[73] Assignee: Eastman Kodak Company, Rochester, N.Y.

[21] Appl. No.: 653,843

[22] Filed: Feb. 11, 1991

[51] Int. Cl.$^5$ .................. H04N 1/00; H04N 1/04
[52] U.S. Cl. .................... 358/488; 358/406; 358/448; 355/317
[58] Field of Search .............. 358/401, 405, 406, 447, 358/448, 464, 474, 453, 463, 488, 400; 355/317, 319, 320, 321; 400/188, 579, 630; 346/134, 140

[56] References Cited

U.S. PATENT DOCUMENTS

| | | | |
|---|---|---|---|
| 3,801,203 | 4/1974 | Hyland et al. | 356/151 |
| 4,202,627 | 5/1980 | Suzki et al. | 356/71 |
| 4,385,325 | 5/1983 | Chen | 358/294 |
| 4,511,242 | 4/1985 | Ashbee et al. | 355/317 |
| 4,697,087 | 9/1987 | Wu | 250/548 |
| 4,831,420 | 5/1989 | Walsh et al. | 355/317 |
| 4,864,415 | 9/1989 | Beikirch | 358/474 |
| 4,876,570 | 10/1989 | Iwaya | 355/204 |
| 4,980,781 | 12/1990 | Yamamoto et al. | 358/474 |

Primary Examiner—Edward L. Coles, Sr.
Assistant Examiner—Jerome Grant, II
Attorney, Agent, or Firm—Dennis R. Arndt

[57] ABSTRACT

A method and apparatus for automatic lateral alignment of front and rear images in a two sided scanning system. A line store is used for each camera to capture image data from a calibration target. A control processor then uses this image data to compute offset values which get stored for future use. The offset is then loaded into a hardware cropping circuit to correct the camera alignment in real time. Difficult manual alignment procedures are thus eliminated.

5 Claims, 7 Drawing Sheets

METHOD AND APPARATUS FOR AUTOMATIC ALIGNMENT OF FRONT AND REAR SCANNING CAMERAS

TECHNICAL FIELD OF THE INVENTION

This invention relates to a method and apparatus for determining the total misalignment of two independent scanning subsystems and in particular, to the alignment of scanning duplex systems for determining the total system misalignment of two independent scanning subsystems. The misalignment information is used to modify the user selected cropping window offsets to compensate for the misalignment, thus producing front and rear images that are properly aligned without requiring mechanical adjustments.

BACKGROUND OF THE INVENTION

When duplex scanning (double sided) the problem of aligning the image from the front side with the image of the rear side becomes a problem. Longitudinal misalignment of these images manifests itself as a black border along the leading edge of the document images. Lateral misalignment (parallel to the direction of direction of document travel) manifests itself as borders on the left and right edges of the front and rear images respectively.

Currently available duplex scanners generally have no provision for lateral alignment or require a mechanical alignment when the scanning cameras are initially installed. Such an approach requires additional mechanical expense and the adjustments can be difficult and time consuming, especially during field replacement of the scanning cameras.

Most scanners have at least one cropping window which allows a large format scanner to reduce the amount of data generated when scanning a document smaller than the full format. For example, a 11×17 inch scanner could crop an image down to 8.5×11 if necessary.

Often platen scanners do two scans of a document, the first is a pre-scan to adjust the cropping window, and the second scan is used to capture the image. This is very advantageous because all borders are removed from the image.

However, in a high speed rotary scanner, it is not possible to perform two scans to establish a cropping window. Because the document is moving in the longitudinal direction, it is feasible to use a low resolution sensor to pre-scan to provide cropping of the leading and trailing edges of the document. Because the document is not moving in the lateral direction, it is expensive to automate the lateral cropping and for this reason, initial alignment becomes more important.

DISCLOSURE OF THE INVENTION

The present invention is directed to a method and apparatus for determining the total system misalignment of two independent scanning subsystems in a duplex (two sided) scanning system. The misalignment information is then used to modify the user selected cropping windows offsets to compensate for the misalignment such that the front and rear images are aligned.

It is an object of the present invention to perform the alignment automatically with no mechanical adjustments.

BRIEF DESCRIPTION OF THE DRAWINGS

The teachings of the present invention may be readily understood by considering the following detailed description in conjunction with the accompanying drawings, in which.

MODES OF CARRYING OUT THE INVENTION

Figure 1:
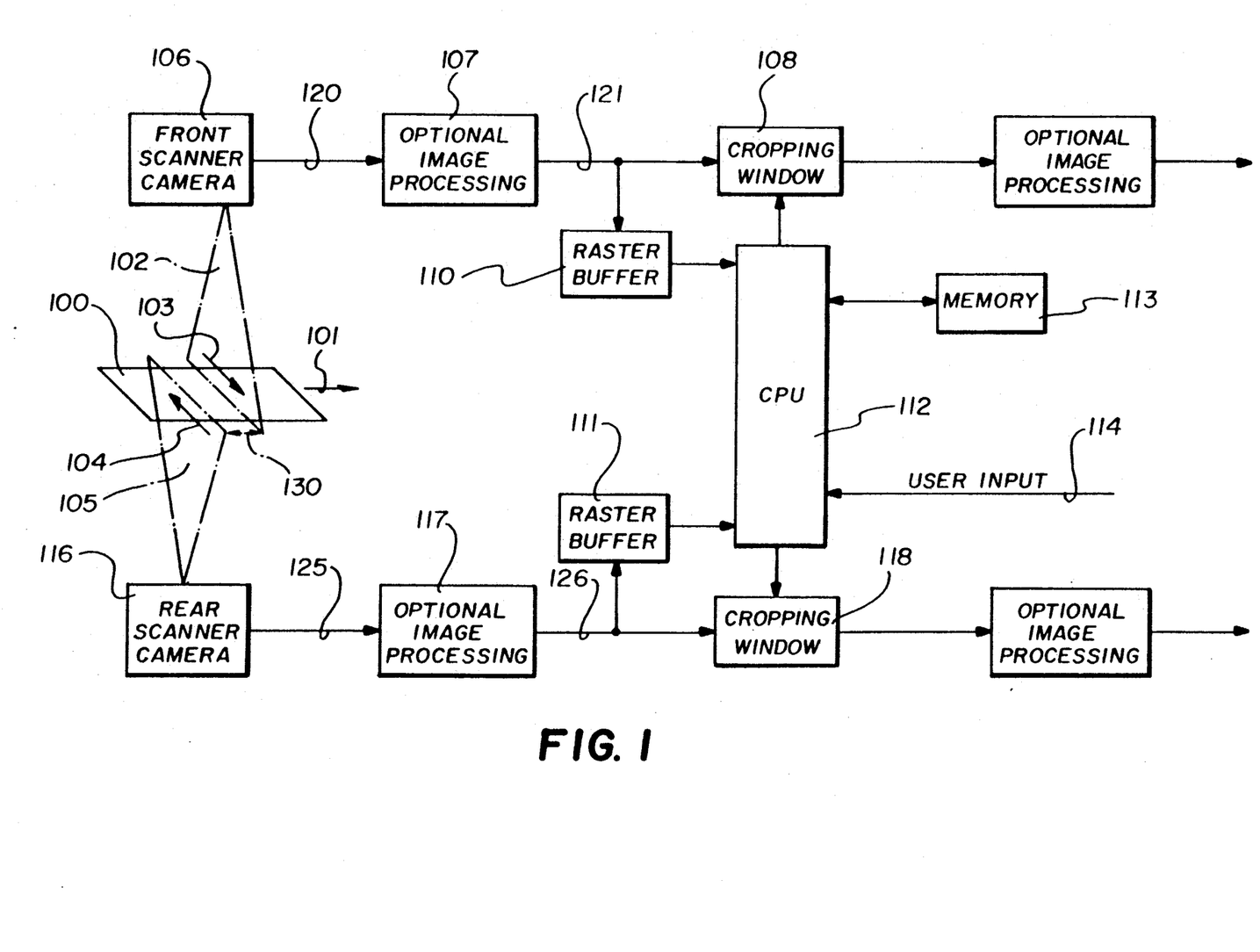
FIG. 1 is a block diagram of a preferred embodiment of the automatic alignment apparatus of the preferred invention.

With reference to FIG. 1, there is shown a block diagram of a preferred embodiment of the automatic alignment system. The document sheet 100 is moving in the direction shown by arrow 101 and is scanned one line or raster at a time by both a front scanning camera 106 and a rear scanning camera 116. Each scanning camera 106 and 116 generates a digital stream of sequential picture elements (pixels) on lines 120 and 125 respectively. Each of the scanning cameras 106 and 116 is comprised of a 5000-by-1 cell charge coupled device (CCD) array, clocking circuits and an analog-to-digital converter (A/D) (not shown). A digital stream of pixel elements are directly proportional to the light reflected 102 and 105 from the front and rear surfaces of the document sheet 100 respectively. With output signal camera 106 being scanned from left to right as shown by arrow 103, it should be noted that rear camera 116 is inverted with respect to front camera 106 such that it scans the rear surface of the document sheet 100 in the direction of arrow 104.

Next, image processing is performed on the data streams 120 and 125 generated by scanning cameras 106 and 116 respectively. The data streams 120 and 125 are then sent to optional image processing 107 and 117 respectively. This image processing may include shading correction, image enhancement, edge detection, and/or thresholding. Application of edge enhancement can help in locating the edges of the target document later. The processed pixel streams 121 and 126 are each sent in parallel to cropping windows 108, 118 and raster buffer 110, 111 respectively.

The raster buffers 110, 111 are memory used to store a plurality of processed image rasters that appear on lines 121, 126 respectively from the front and rear cameras 106, 116. This stored image raster information is used by central processing unit (CPU) 112. The buffers may be written to by using dedicated hardware under the control of CPU 112 or in slower systems, CPU 112 may actually store the rasters into the raster buffers 110, 111. CPU 112 uses the front raster data 110 and the rear raster data 111 to calculate the lateral misalignment 130 between what is seen by front camera 106 and what is seen by rear camera 116. The magnitude of the misalignment is saved by the CPU 112 in local memory 113 which is used to modify the cropping parameters inputted by a user on line 114. The modified cropping parameters are loaded into the cropping window system 108, 118.

Cropping windows 108, 118 eliminate pixels outside a window specified by the user on line 114. The purpose of this is to reduce the size of the final image when the scanning size is larger than the document size or if the user is interested in only part of the document. Specification of the cropping window requires four parameters: (1) horizontal offset, (2) lateral width of the document, (3) begin scan, (4) longitudinal length of the document. Alternatively, these parameters may be specified using two diagonal points of a rectangle. Further, image processing 109, 119 may occur after the cropping. The user input horizontal offset is modified to produce the adjusted horizontal offset which is then loaded into the hardware cropping window circuit.

Tolerance accumulation in one direction will result in the scan subsystems being aimed at different areas of the document. In operation one would like to limit the usable scan width 150 to the actual document 100 itself, to save on storage requirements, therefore it is desirable to have the scanner crop the image.

This automatic adjustment is comprised of capturing rasters of a target image, typically by feeding a plain white sheet of paper. The edges of that target are located and any misalignment of the detectors is then calculated. This procedure must be done at least once after the scanning subsystem's initial installation or when a replacement scanner has been installed. If the system does not have a means for storing the misalignment information when the power is removed, the procedure must be repeated each time the system is powered up.

Figure 2A:
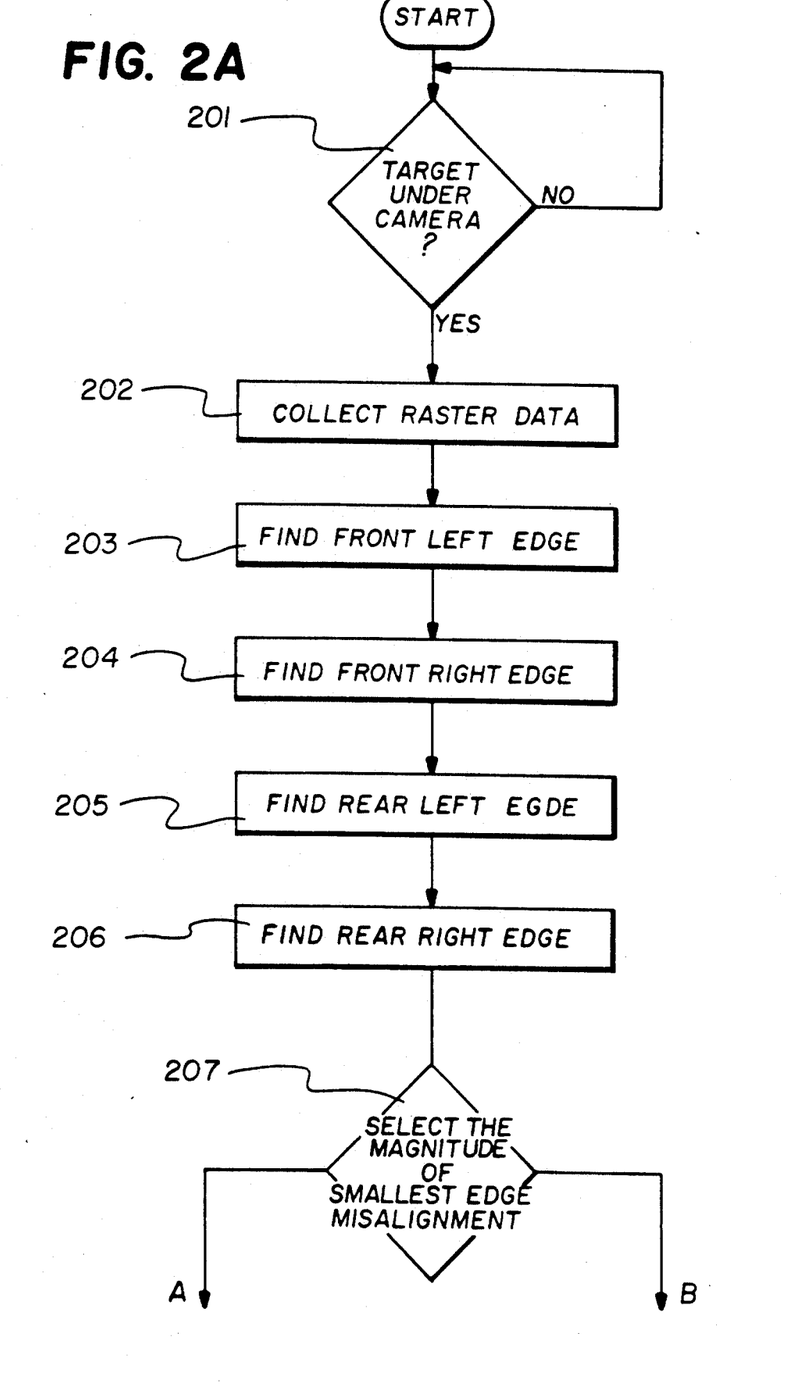
FIGS. 2A & 2B illustrates a flowchart of the automatic alignment apparatus shown in FIG. 1.
Figure 2B:
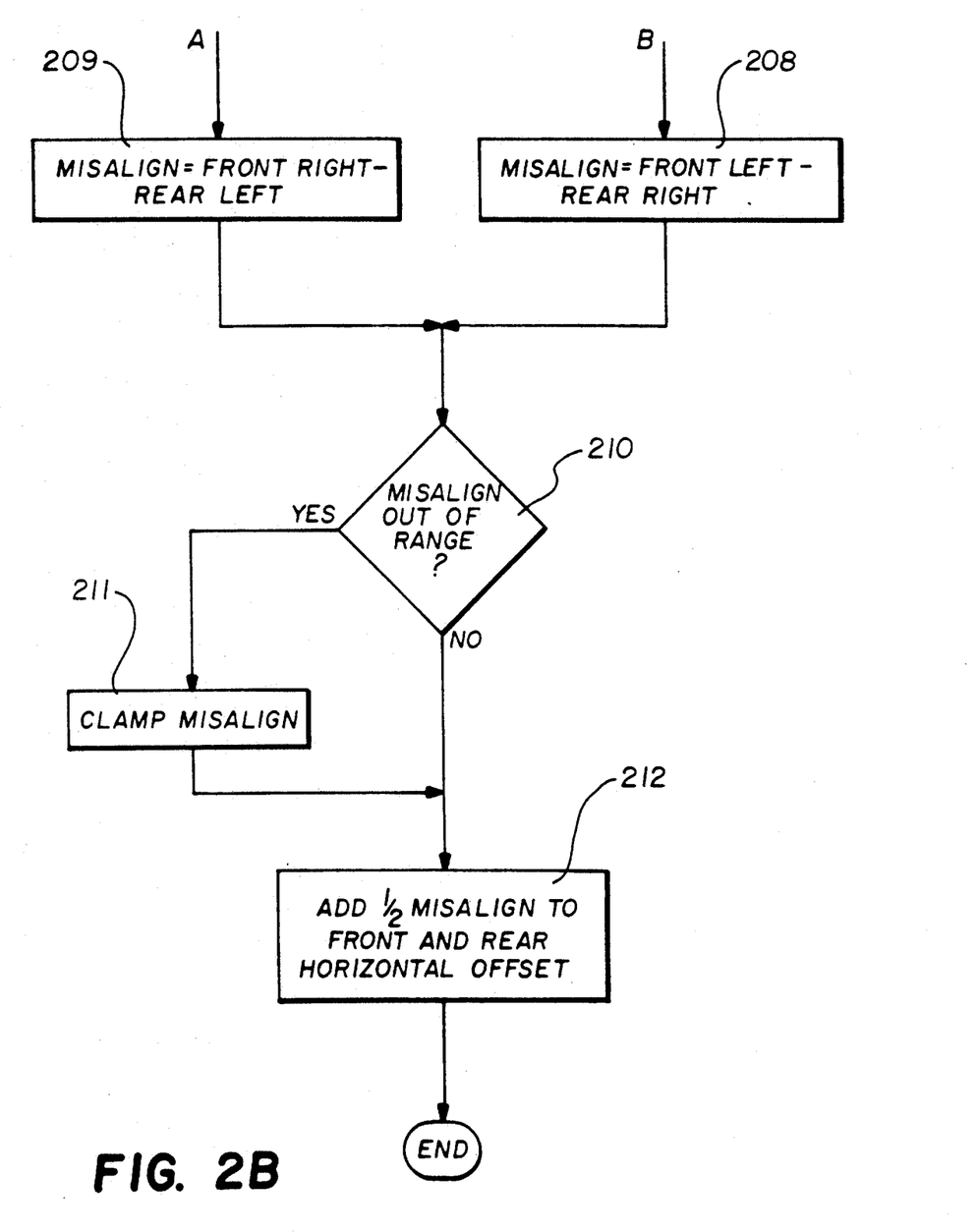

FIGS. 2A & 2B illustrates a software flowchart for a preferred embodiment of the automatic alignment system of the present invention.

Initially, in step 201 a calibration target or blank sheet of paper is fed into the machine as part of a calibration sequence which may include any or all of the following front to rear alignment of the leading/trailing edge of the image, lamp adjustment, shading correction, dead pixel isolation, and diagnostic checks. In step 201, the CPU must verify that the target document is under the camera before collecting the data from both cameras 106 and 116 in step 202.

Figure 4:
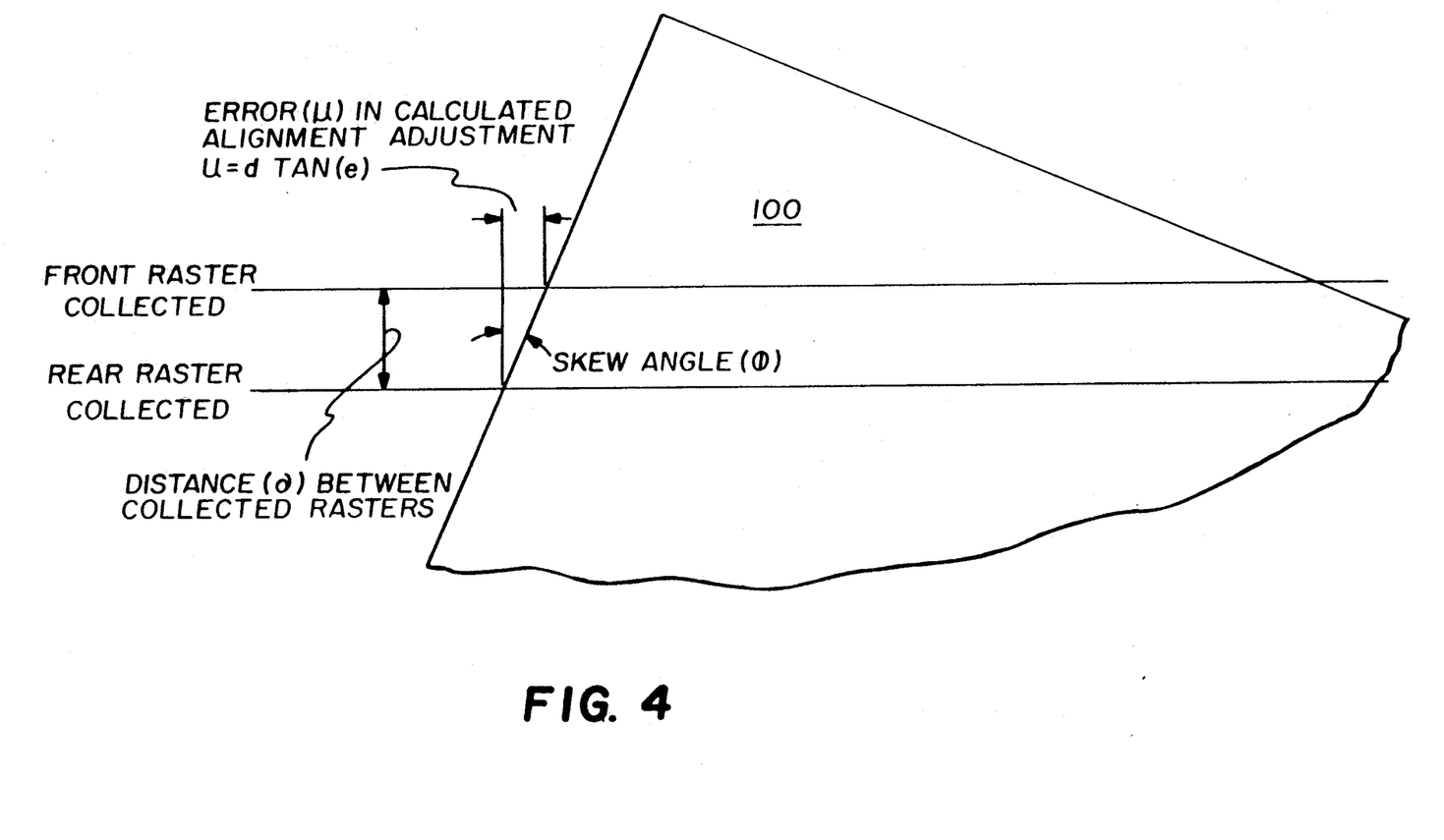
FIG. 4 illustrates how error is introduced in a misalignment calculation by a skewed target in a system where the front and rear cameras are not aligned.

A longitudinal offset between the two scanning cameras 106, 116 may exist because of packaging reasons such as limited space in the machine and to prevent back lighting of the document if the document lighting and scanning of both sides where coincident. If the longitudinal offset is large, it may be necessary to repeat steps 201 and 202 for the individual cameras. However, it is important to collect the rasters used for alignment from as near as possible to the same longitudinal position or the document to minimize calculation error. As shown in FIG. 4, any skewing of the calibration target introduces a calculation error equal to the front to rear longitudinal distance between collected rasters multiplied by the tangent of the skew angle.

The front and rear edges as well as left and right edges of the document sheet are found in steps 203, 204, 205 and 206 using edge detection well known in the art. One method is to locate the first white pixel when scanning right to left and then left to right. Any inherent offsets to the first usable pixel (FIG. 3) such as overscanned pixels, pipeline delays or masked pixels in the camera must be taken into account when calculating the distance from the edge of the usable scan width to the edge of the calibration target.

In step 207, the front right edge to rear left edge misalignment |front right-rear left| is compared to the front left edge to rear right edge misalignment |front left-rear right|. Because the cameras 106, 116 are inverted with respect to one another, the front right edge and rear left edge should be the same edge on the document if there is no misalignment. This method is also insensitive to the size of the calibration target used. Most factors (example skew) contribute to calculation errors and tend to make the misalignment appear to be larger than it is, therefore the smaller value is selected in steps 208 and 209. Alternately, the average misalignment value could be used.

Figure 5:
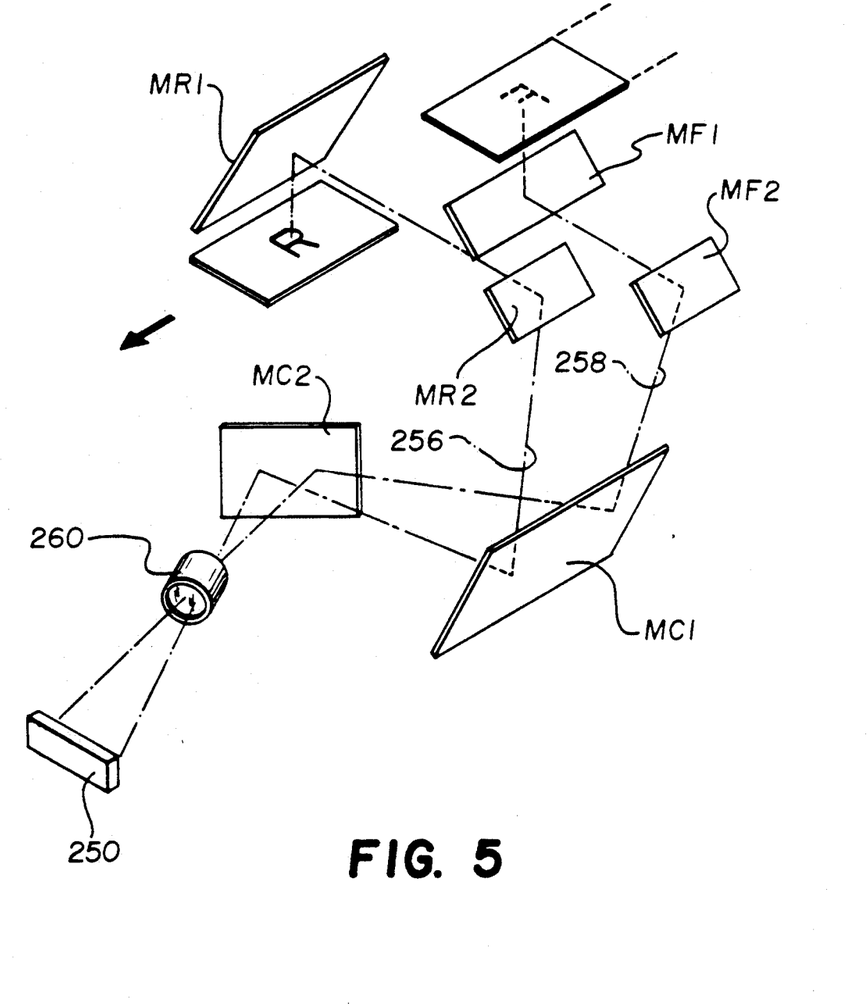
FIG. 5 illustrates a second embodiment which uses mirrors to deliver both front and rear images to different parts of a single photo sensor.

The misalignment is checked in step 210 to determine if it is in or out of range. If found to be the latter, the value of the misalignment is limited in step 211 by clamp to value to within an acceptable range. The range that can be adjusted is limited by the amount of over scanning that exists as illustrated in FIG. 5. If the scanning camera is outputting 5000 pixels per line at 400 dots per inch and the usable scan width 150 (largest document to be scanned) is 12 inches wide, the over scan is 5000−(12 * 400) or 200 pixels. This would allow ±100 pixels or ±0.25 inches of over scan. If the front camera is moved +0.25 inches and the rear camera is moved ±0.25 inches, the total range is ±0.5 inches.

Figure 3:
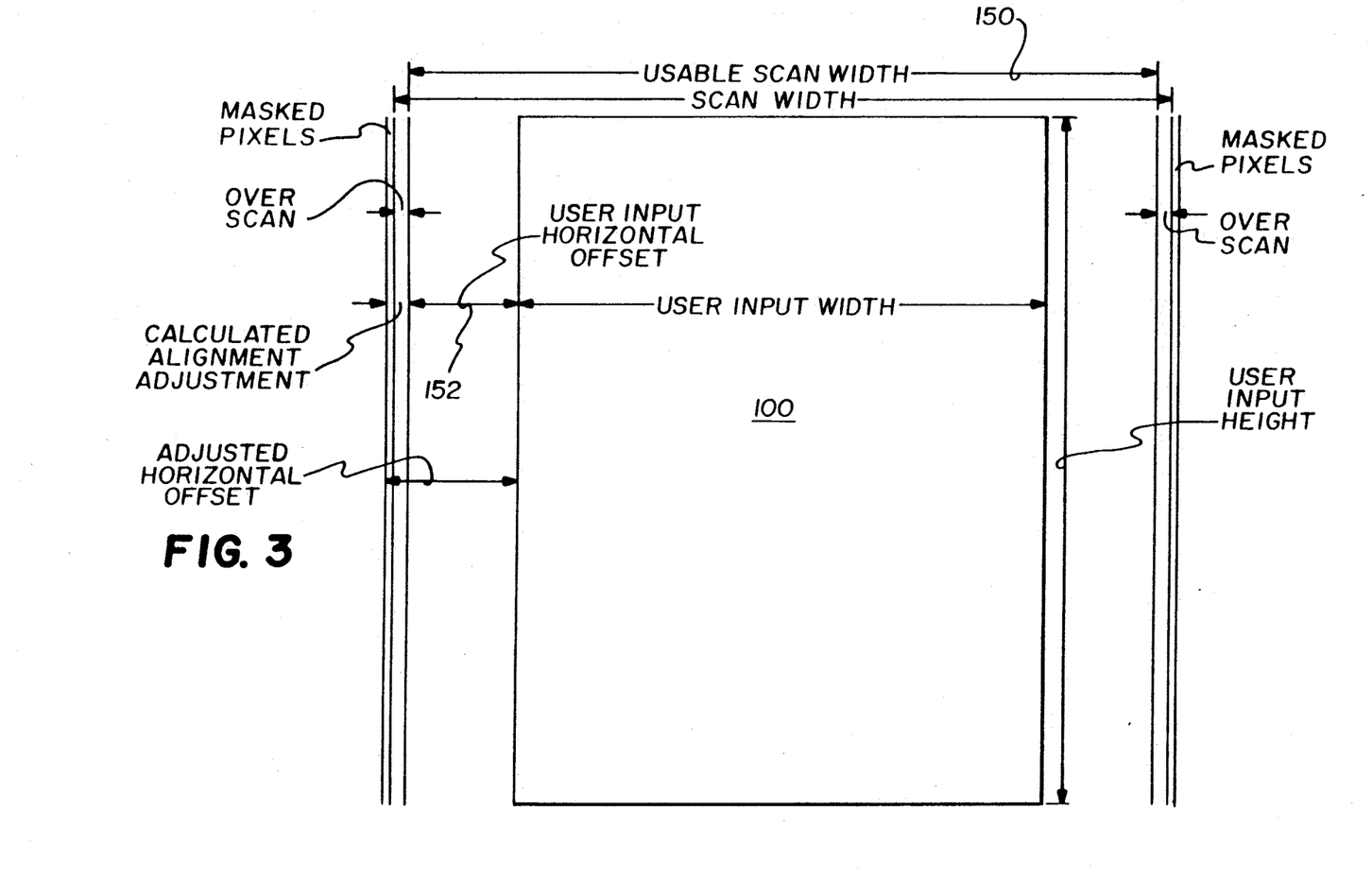
FIG. 3 illustrates the relative locations of different areas of the total field scanned.

In final step 212 CPU 112 modifies both the front and rear requested horizontal offset entered by the operator on line 114 by adding half of the horizontal misalignment of the cameras 106, 116 which may be positive or negative, to the nominal horizontal offset 152 shown in FIG. 3 to fully correct for the misalignment. Once the cropping parameters have been calculated and loaded into the cropping window hardware 108, 118, actual cropping can be performed in real time by CPU 112.

The actual program software in "C" is shown in Appendix A in accordance with the teaching of the present invention.

Another embodiment uses mirrors and a single CCD 250 to capture the image of both sides of the document. The output of the CCD is later divided into two images as if it came from two cameras. The misalignment is calculated similar to the two cameras system described above. The misalignment information is either loaded into the cropping hardware and may be used to set the dividing point on the CCD to identify two individual images.

FIG. 5 illustrates the manner in which the front and rear sides of each document have their images supplied through folded optical paths 256 and 258 via the lens 260 to the appropriate locations on the linear CCD array 250.

Figure 6:
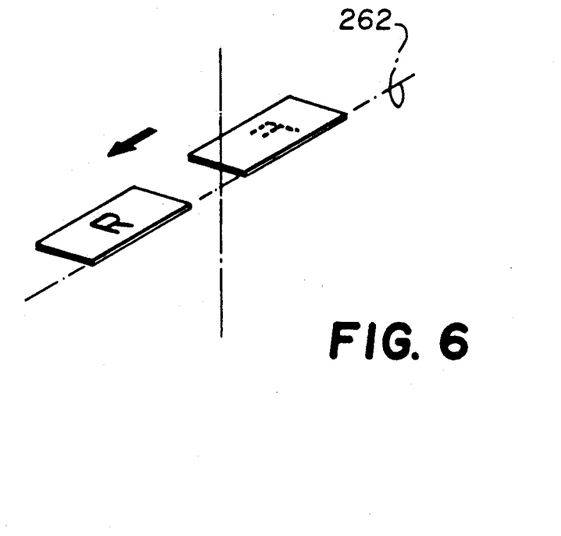
FIGS. 6 and 7 further illustrate the relationships of the optical system shown in FIG. 5.

In this multiple path folded optical system, the offset position of the front and rear images is achieved by placing the optical axis of the system through the common line denoting the reference or aligned edge 262 of the documents as shown in FIG. 6.

Figure 7:
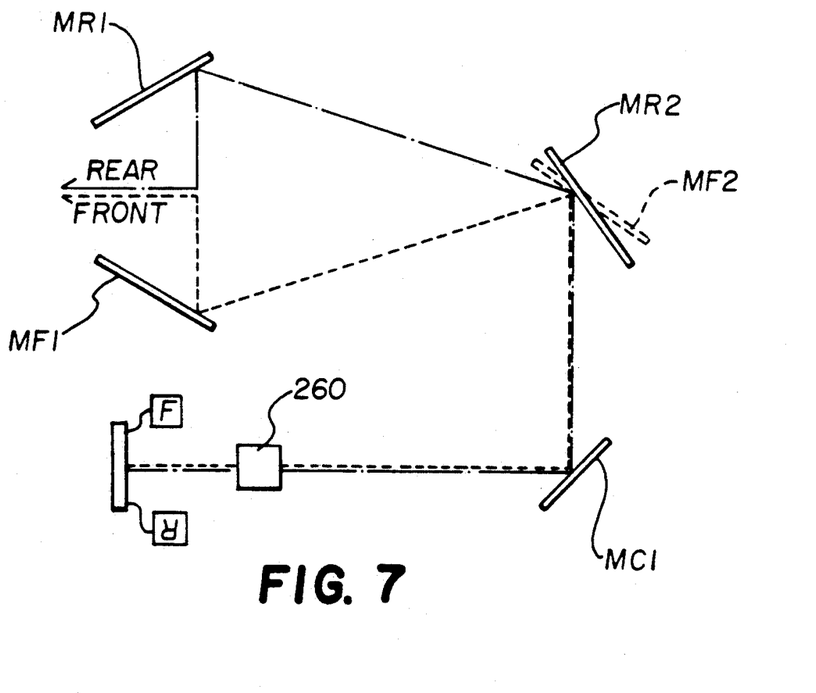

FIG. 7 is a generalized side view of the optical system showing the manner in which the arrangement of the optics provides the necessary image offset. In order to obtain greater offset in the image position to provide spacing between sequential documents on the linear array, two mirrors in one of the optical paths must be adjustable to provide the appropriate image shift while maintaining their path lengths equal. Such adjustment comprises rotation of one of the mirrors with rotation and translation of a second mirror.

In the optical system described above the front and rear faces of successive documents brought to a common line on the linear array, so that gaps are minimized between documents. Because documents of varying sizes are photographed, the document width is indicative and used to govern the transport speed.

In practice the system comprises a suitable serial feed document transport system (not shown) by which the documents are successively presented to the recording station, one by one, in continuous motion. At least a portion of the document transport is arranged so that front and rear sides of the documents are in full view. At these locations first and second sets of fixed mirrors convey images of the front and rear sides of the document to a fixed common path mirror (MC1), from which the images are reflected to a second common path mirror (MC2). From this second mirror the images are supplied through a lens to a linear array CCD 250 scanning surface. The optical parts are disposed and arranged so that the front and rear sides of a document are imaged transversely on the CCD array in an end-to-end relationship.

ADVANTAGES AND INDUSTRIAL APPLICABILITY

The invention advantageously determines the total system misalignment of two independent scanning subsystems and then uses this information to modify the user selected cropping window offsets to compensate for the misalignment so that front and rear images of a document are aligned without requiring costly mechanical adjustments. The present invention finds use in duplex document scanners and document storage systems that create and store digital images of documents.

What is claimed is:

1. An image scanning apparatus for generating a data stream of an image of both a front and rear of a document projected on a scanning device, comprising:
   a) means for scanning the front of a document to produce a front digital image;
   b) means for scanning the rear of a document for producing a rear digital image;
   c) detecting means for detecting misalignment between the front and rear digital images;
   d) means responsive to the front digital image and the rear digital image to produce an offset value representing the misalignment between the front and rear digital images, if any;
   e) means responsive to the offset value for shifting the front digital image with respect to the rear digital image to align the front and rear digital images.

2. The image scanning apparatus as set forth in claim 1 wherein a CPU is used to calculate the offset value representing the amount of misalignment between the front and rear digital images.

3. The image scanning apparatus as set forth in claim 2 wherein a cropping window is used to shift the front digital image with respect to the rear digital image an amount corresponding to the calculated offset value.

4. A method of aligning the front and rear images upon a respective front and rear surface of a document on a scanning device, comprising the steps of:
   a) scanning the front image on the front surface of the document to produce a front digital image;
   b) scanning the rear image on the rear surface of the document to produce a rear digital image;
   c) detecting means for detecting misalignment between front and rear digital images;
   d) producing an offset value representing the misalignment;
   e) shifting the front digital image with respect to the rear digital image based on the offset value to align the front and rear digital images.

5. An image recording apparatus for recording a data stream representing both the front and rear surfaces of a document, comprising:
   a) means for scanning the front and rear surface of a document to produce front and rear digital images of said document surfaces;
   b) means for detecting a misalignment between the images;
   c) means responsive to the front digital image and the rear digital image to produce an offset value representing the misalignment between the images; and
   d) means responsive to the offset value for shifting the front digital image with respect to the rear digital image to align the front and rear digital images.

* * * * *